US012294929B2

(12) United States Patent
Schumacher et al.

(10) Patent No.: US 12,294,929 B2
(45) Date of Patent: May 6, 2025

(54) RAPID USER EQUIPMENT ROUTE SELECTION POLICY RULE PROCESSING

(71) Applicant: T-Mobile Innovations LLC, Overland Park, KS (US)

(72) Inventors: Gregory Schumacher, Holliston, MA (US); Marouane Balmakhtar, Fairfax, VA (US); Serge Manning, Plano, TX (US)

(73) Assignee: T-Mobile Innovations LLC, Overland Park, KS (US)

( * ) Notice: Subject to any disclaimer, the term of this patent is extended or adjusted under 35 U.S.C. 154(b) by 464 days.

(21) Appl. No.: 17/734,553

(22) Filed: May 2, 2022

(65) Prior Publication Data

US 2023/0354143 A1 Nov. 2, 2023

(51) Int. Cl.
*H04W 40/02* (2009.01)
*H04L 45/74* (2022.01)

(52) U.S. Cl.
CPC ............. *H04W 40/02* (2013.01); *H04L 45/74* (2013.01)

(58) Field of Classification Search
CPC ............................... H04W 40/02; H04L 45/74
See application file for complete search history.

(56) References Cited

U.S. PATENT DOCUMENTS

| 6,564,261 | B1 * | 5/2003 | Gudjonsson | H04L 9/40 379/900 |
| 10,652,942 | B2 | 5/2020 | Zamora et al. | |
| 2004/0008697 | A1 * | 1/2004 | Millard | H04L 45/505 370/392 |
| 2007/0079379 | A1 * | 4/2007 | Sprosts | H04L 63/145 726/24 |
| 2018/0278632 | A1 * | 9/2018 | Fu | H04L 9/40 |
| 2020/0267753 | A1 * | 8/2020 | Adjakple | H04W 72/54 |
| 2021/0226914 | A1 * | 7/2021 | Shan | H04L 67/142 |
| 2021/0250811 | A1 * | 8/2021 | Guo | H04L 63/1458 |
| 2021/0258385 | A1 * | 8/2021 | Wang | H04L 67/14 |
| 2022/0330361 | A1 * | 10/2022 | Ding | H04W 48/10 |
| 2023/0421407 | A1 * | 12/2023 | Zhao | H04L 12/189 |

FOREIGN PATENT DOCUMENTS

| WO | 2020252281 A1 | 12/2020 |
| WO | 2021035206 A1 | 2/2021 |

* cited by examiner

*Primary Examiner* — Christine Ng
(74) *Attorney, Agent, or Firm* — Jones Robb, PLLC (57) ABSTRACT

Systems and methods are provided for rapid user equipment route selection policy rule processing. A method includes determining an applicable routing policy based on user equipment route selection policy (URSP) rules for an established protocol data unit (PDU) session and storing PDU session information with the established uplink PDU session in a cache. The method further includes examining subsequent uplink packets for PDU session information and checking the cache for an established PDU session with matching uplink PDU session information. The method additionally includes routing the subsequent uplink packets to the established PDU session having the matching PDU session information, causing the subsequent uplink packet to be processed in accordance with the applicable routing policy as previously determined based on the URSP rules.

20 Claims, 7 Drawing Sheets

RAPID USER EQUIPMENT ROUTE
SELECTION POLICY RULE PROCESSING

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)).

As access nodes have evolved, networks may include a combination of multiple access node such as 4G LTE evolved NodeBs (eNodeBs) and 5G NR next generation NodeBs (gNodeBs) or alternatively may be exclusively 4G or 5G cellular systems. 5G networks aim to offer new technical solutions allowing for a greater throughput, lower latency, higher reliability, higher connectivity, and higher mobility range than previous technologies. 5G networks are also expected to extend the flexibility in the network usage and to enable users with a wider range of use cases and business models.

User equipment route selection policy (URSP) rules are a new capability added to 5G. They are used to implement route selection policies in UEs under control of the 5G network where each packet sent by the UE has the URSP rules applied to determine which uplink flow is used to transport the packet towards its destination. The URSP rules enable the steering of applications and services with specific requirements to defined slices. Multiple slices allow wireless devices to have multiple profiles to secure different levels of experience, security, and privacy requirements, based on the needs of the different business or enterprise applications.

The 3GPP specification explains how URSP rules and other UE policy capabilities are evaluated to determine which uplink protocol data unit (PDU) session to send a particular IP packet. The policies are set up so that for every packet sent by the wireless devices, these policies and rules are applied. Thus, in a worst case scenario, these rules and policies are re-evaluated for every uplink user plane packet. The repetitive re-evaluation of URSP rules can be expensive in terms of resources, such as time, battery life, and central processing unit (CPU) cycles for the wireless devices. Hence, UEs may be negatively impacted.

Accordingly, in order to conserve resources and enhance UE performance, a solution is need for optimizing re-evaluation of URSP rule processing in 5G networks. Optimally, the proposed solution should increase the efficiency of URSP and other UE policy processing, increase battery life and reduce resource usage on the UE, and decrease uplink packet processing latency.

OVERVIEW

Exemplary embodiments described herein include systems, methods, and non-transitory computer readable mediums for rapid re-evaluation of URSP rule processing. An exemplary method includes determining an applicable routing policy based on user equipment route selection policy (URSP) rules for an established uplink protocol data unit (PDU) session. The method further includes storing uplink PDU session information with the established uplink PDU session in a cache, examining subsequent uplink packets for uplink PDU session information, and checking the cache for an established PDU session with matching uplink PDU session information. Upon locating matching uplink PDU session information, the method routes the subsequent uplink packets to the established PDU session having the matching PDU session information, causing the subsequent uplink packet to be processed in accordance with the applicable routing policy as previously determined based on the URSP rules.

An additional exemplary embodiment includes a wireless device including at least one memory storing a protocol data unit (PDU) session cache including PDU session information for at least one established PDU session. The wireless device additionally includes at least one processor managing the PDU session cache by performing multiple operations. The multiple operations include examining uplink packets for PDU session information and checking the PDU session cache for an established PDU session with matching PDU session information. The operations additionally include adding a new PDU session to the PDU session cache when no matching PDU session information is located in the PDU session cache and when the matching PDU session information is located, routing the uplink packet to the established PDU session having the matching PDU session information, causing the uplink packet to be processed in accordance with an applicable routing policy previously determined based on user equipment route selection policy (URSP) rules.

In yet a further exemplary embodiment, a non-transitory computer readable medium stores instructions executed by a processor to perform multiple operations. The operations include examining uplink packets for PDU session information and checking a PDU session cache for an established PDU session with matching PDU session information. The operations additionally include adding a new PDU session to the PDU session cache when no matching PDU session information is located in the PDU session cache. When the matching PDU session information is located, the operations include routing the uplink packet to the established PDU session having the matching PDU session information, causing the uplink packet to be processed in accordance with an applicable routing policy previously determined based on user equipment route selection policy (URSP) rules.

DETAILED DESCRIPTION

Exemplary embodiments described herein include systems, methods, and computer readable mediums for rapid user equipment route selection policy rule processing. Embodiments set forth herein provide for enhanced wireless device performance in 5G networks.

More specifically, embodiments set forth herein include enhanced logic for leveraging the relative invariant nature of internet protocol (IP) traffic to provide UE uplink packet policy processing optimizations in order to reduce the UE resource usage (battery life, latency, CPU cycles) applying the policies. Routing occurs based on evaluation of the URSP rules. Each URSP rule can include a rule precedence value, a traffic descriptor, and one or more route selection descriptors (RSDs). Embodiments set forth herein eliminate the requirement for evaluation of the full URSP traffic descriptor for every packet. In addition, since the PDU session for any given application communication will be established before the first uplink packet is sent by the UE for that session, all subsequent packets for the same PDU session will use the same PDU routing/selection. Therefore, the full URSP RSD need not be evaluated to route and send each subsequent uplink packet.

Using transmission control protocol (TCP) as an example, once a TCP session is established, all subsequent traffic sent by a UE in the same TCP session will be addressed to the same destination IP tuple. Until the URSP rules, UE policies, or rule trigger conditions change, all the TCP traffic to that destination IP tuple will have the exact same URSP rules and UE policies apply, leading to selection of the same PDU session. The PDU session parameters are already established before the first TCP uplink packet is sent.

Hence, until the URSP rules expire, are invalidated (e.g., due to location change), are updated by the network, a PDU session is torn down, or UE local policies change, all uplink IP packets with specific PDU session parameters, such as source and destination IP addresses and source and destination port numbers (tuple), are routed to the same PDU session.

Accordingly, in embodiments set forth herein, UE logic processing the URSP rules first checks a PDU session cache. The PDU session cache may include, for example, source and destination IP addresses and ports and PDU session identifiers corresponding to established PDU sessions. If a matching cache entry exists, then the UE logic routes the IP packet is routed to the matching PDU session retrieved from the cache, bypassing further policy routing evaluation. However, if the matching PDU session information having the IP tuple does not exist in the cache, then a full URSP evaluation takes place and the resulting PDU session information is added to the cache. In the case of TCP or user datagram protocol (UDP), the tuple is a 5-tuple consisting of the source IP address, source port, destination IP address, destination port, and transport protocol. In case of internet control message protocol (ICMP) Queries, the tuple is a 3-tuple consisting of the source IP address, destination IP address, and ICMP Identifier. Other information may also be stored in the PDU session cache.

Accordingly, once a packet has been evaluated, enhanced logic stores a shortcut based on IP tuples in order to simplify routing evaluation. Once the logic establishes connectivity factors for a PDU session, a shortcut is saved so that full URSP rule set need not be re-evaluated. Thus, the enhanced logic determines that subsequent traffic belongs to a PDU session based on the stored shortcut. Once a PDU session is established and the logic has evaluated it, the system uses that information to tag subsequent traffic that belongs to the same IP flow to minimize re-evaluation of the USRP rules. The stored shortcuts remain until one of several predetermined events occur. When one of these events occurs, the shortcuts may be discarded. The approach described herein increases the efficiency of URSP and other UE policy processing, increases wireless device battery life, reduces resource usage, and decreases uplink packet processing latency.

An exemplary system described herein includes at least an access node (or base station), such as an eNodeB, or gNodeB, and a plurality of end-user wireless devices. The disclosed technology may be applied to communication between an end-user wireless device and an access node (e.g., base station) and other network resources, such as relay nodes, controller nodes, antennas, etc. Further, multiple access nodes may be utilized. For example, some wireless devices may communicate with an eNodeB and others may communicate with a gNodeB.

In addition to the above-described methods, the operations of rapid user equipment route selection policy rule processing may be implemented as computer-readable instructions or methods for executing the instructions or methods. Further, the method may be performed by a wireless devices and may be facilitated through a processing node or processor included in an access node or a processor included in any controller node in the wireless network that is coupled to the access node.

Figure 1:
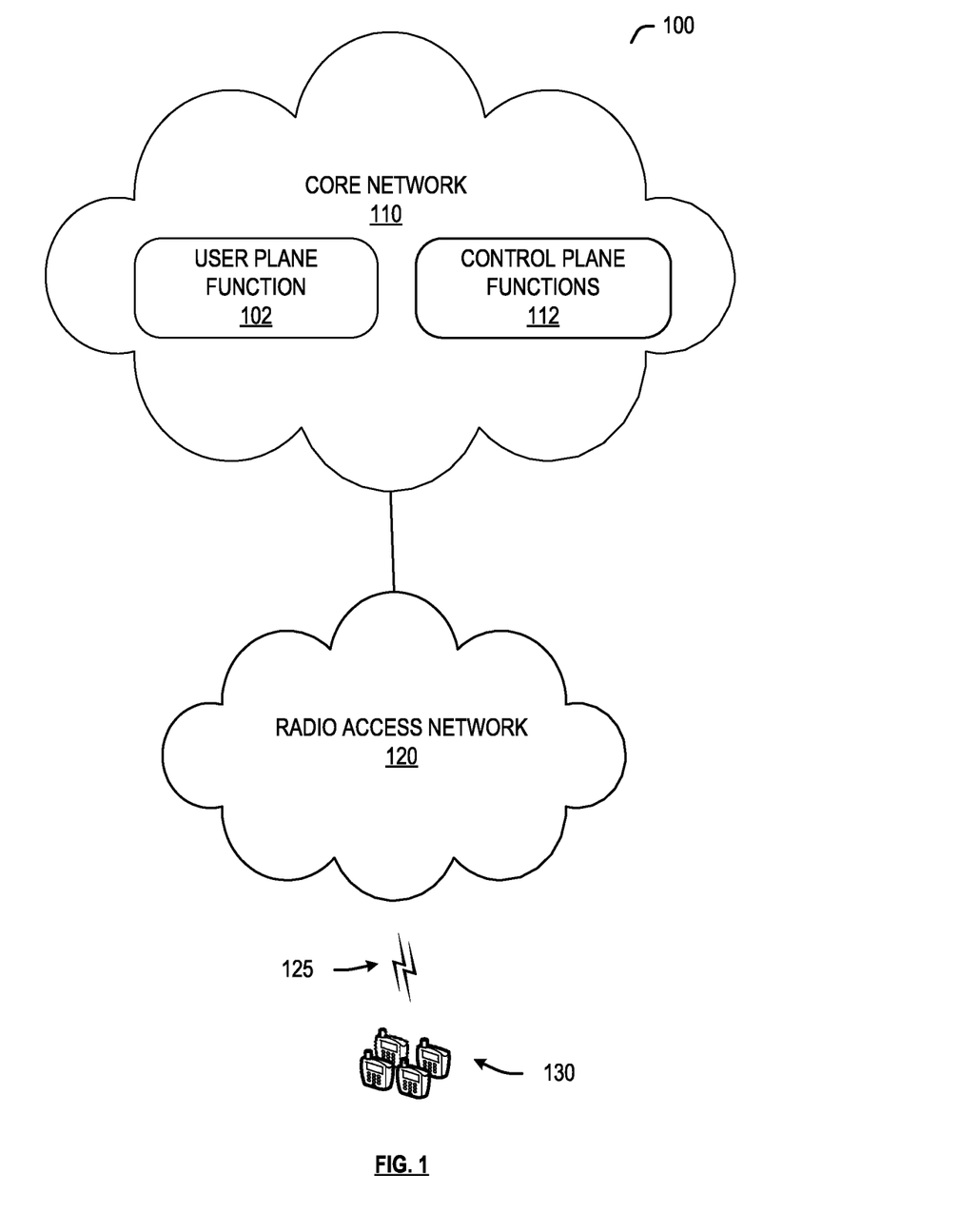
FIG. 1 depicts an exemplary system for wireless communication, in accordance with the disclosed embodiments.

FIG. 1 depicts an exemplary communication network 100. A core network 110 includes a user plane functions 102 and control plane functions 112. The core network 110 is illustrated as being coupled to a radio access network (RAN) 120 that serves wireless devices 130 over communication links 125. For example, the wireless devices 130 can be end-user wireless devices (e.g., UEs), communication links 125 use 5G NR, 4G LTE, or any other suitable type of radio access technology (RAT), and core network 110 can be structured using a service-based architecture (SBA) utilizing core network functions and elements, including the user plane functions 102 and the control plane functions 112. The control plane functional elements 112 handle mostly signaling procedures (e.g., network attachment procedures and management of user-data plane paths). The user plane functional elements 102 handle mostly packet forwarding, based on rules set by the control plane elements 112. The user plane functions can include applying quality of service (QoS) policies to data packets traversing the user plane, managing data sessions associated with different rules such as guaranteed bit rate (GBR) and maximum bit rate (MBR) and token buckets associated therewith, pipeline processing, synchronizing transmission of data packets and control signals with timers at various operational levels, and so on.

The RAN 120 can include various access network functions and devices disposed between the core network 110 and the end-user wireless devices 130. For example, the RAN 120 includes at least an access node (or base station), such as an eNodeB and/or gNodeB communicating with a plurality of end-user wireless devices 130. It is understood that the disclosed technology may also be applied to communication between an end-user wireless device and other network resources, depending on the RAT and network technology being implemented. Further, either of core network 110 and radio access network 120 can include one or more of a local area network, a wide area network, and an internetwork (including the Internet) and capable of communicating signals and carrying data, for example, to support voice, push-to-talk, broadcast video, and data communications by end-user wireless devices 130.

The core network 110 may incorporate many functions not shown in FIG. 1. For example, the control plane functions 112 may include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The user plane functions 102 may also include, for example, a Unified Data Repository (UDR). Control plane functions 112 can provide one or more network functions based on a request-response or subscribe-notify model. The network functions may form a micro services-based architecture, which may include network functions distributed over different cloud infrastructures. Additionally, many services may span different network functions and domains that work in unison.

The NRF maintains the list of available network functions and their profiles. The NRF maintains an updated repository of the network components along with services provided by each of the elements in the core network. The NRF additionally provides a discovery mechanism that allows the elements to discover each other. The NRF provides a registration function that allows each network function to register a profile and a list of services with the NRF. It also performs services registration and discovery so that different network functions can find each other. As one example, the SMF, which is registered to NRF, becomes discoverable by the AMF when a UE or other device tries to access a service type served by the SMF. The NRF broadcasts available services once they are registered in the core network 110. To use other network functions, registered functions can send service requests to the NRF.

The UDM interfaces with network functions such as AMF and SMF so that relevant data becomes available to AMF and SMF. The UDM generates authentication vectors when requested by the AUSF, which acts as an authentication server. The AMF performs the role of access point to the 5G core, thereby terminating RAN control plane and UE traffic originating on either the N1 or N2 reference interface. In the 5G core, the functionality of the 4G Mobility Management Entity (MME) is decomposed into the AMF and the SMF. The AMF receives all connection and session related information from the UE using N1 and N2 interfaces, and is responsible for handling connection and mobility management tasks.

The UDR may provide unified data storage accessible to both control plane NFs and user plane NFs. Thus, the UDR may be a repository shared between control plane NFs and the UPF. The UDR may include information about subscribers, application-specific data, and policy data. The UDR can store structured data that can be exposed to an NF. The UPF may perform operations including, but not limited to, packet routing and forwarding, packet inspection, policy enforcement for the user plane, Quality-of-Service (QoS) handling, etc. When compared with 4G EPC, the functions of the UPF may resemble those of the SGW-U (Serving Gateway User Plane function) and PGW-U (PDN Gateway User Plane function). As will be further described herein, the PCF forwards URSP rules to the UEs via the AMF and RAN 120.

Wireless devices 130 may be any device, system, combination of devices, or other such communication platform capable of communicating wirelessly with RAN 120 using one or more frequency bands deployed therefrom. Each of wireless devices 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via RAN 120. Other types of communication platforms are possible.

Other network elements may be present to facilitate communication but are omitted for clarity, such as base stations, base station controllers, mobile switching centers, dispatch application processors, and location registers such as a home location register or visitor location register. Components not specifically shown in FIG. 1 can further include processing nodes, controller nodes, routers, gateways, and physical and/or wireless data links for communicating signals among various network elements, additional base stations, controller nodes, telephony switches, internet routers, network gateways, computer systems, communication links, or other type of communication equipment, and combinations thereof.

Figure 2:
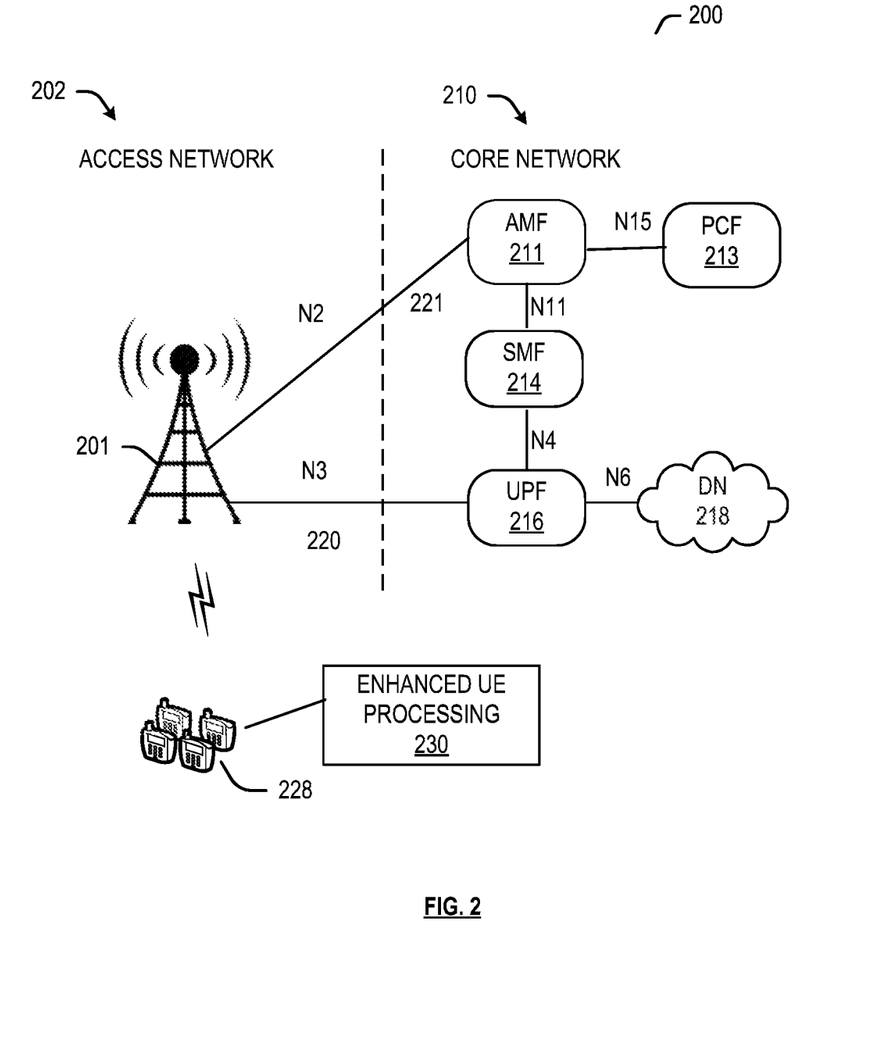
FIG. 2 illustrates an exemplary configuration showing control and user plane separation within a 5G system in accordance with disclosed embodiments.

FIG. 2 depicts incorporation of embodiments described in an exemplary 5G system 200. The components of system 200 include an access network 202 including at least an access node 201, which can include a gNodeB. Data packets traverse access network 202 and a core network 210 via the user plane 220, while control signals are transmitted across access network 202 and core network 210 via a control plane 221. In an exemplary embodiment, access and mobility function (AMF) 211 and session management function (SMF) 212 function similarly to mobility management entities in 4G systems. For example, the AMF 211 can receive connection requests from one or more wireless devices 228 via access node 201, and manages anything to do with connection or mobility management, while forwarding session management requirements over an N11 interface to the SMF 214. Meanwhile, the SMF 214 is primarily responsible for interacting with the decoupled data plane 221, creating updating and removing Protocol Data Unit (PDU) sessions and managing session context with a UPF 216. The PDU session defines an association between the wireless devices 228 and the DN 218 that provides a PDU connectivity service. The PDU connectivity service provides exchange of PDUs between the wireless devices 228 and the DN 218. Each PDU session can include a PDU session ID and one or more quality of service (QoS) flows and QoS rules.

In the displayed 5G service based architecture (SBA), the session management function (SMF) 214 is responsible for interacting with the data plane 220 and managing session context with the user plane function (UPF) 216. Thus, the SMF 214 deals with session management aspects by creating, updating, and removing PDU sessions and handles session context with the UPF 216. The SMF 214 sends messages to the UPF 216 over the N4 reference interface using packet forwarding control protocol (PFCP). The UPF 216 performs packet processing and connects wireless devices 228 via the access network 202. Specifically, the UPF 216 is responsible for packet routing and forwarding, packet inspection, quality of service (QoS) handling, and external packet data unit (PDU) session for the interconnecting data network (DN) 218, in the 5G architecture.

Generally, the UPF 216 represents the data plane evolution of a 4G CUPS system, which decouples PDN gateway (PGW) and serving gateway (SGW) control and user plane functions, enabling data forwarding to be decentralized. This allows packet processing and traffic aggregation to be performed closer to the network edge, increasing bandwidth efficiencies while reducing network. The UPF 216 functions similarly, by providing an interconnect point between the mobile infrastructure and the DN 218, encapsulation and decapsulation of GPRS Tunnelling Protocol for the user plane (GTP-U), acting as a PDU session anchor point for providing mobility within and between Radio Access Technologies (RATs), including sending one or more end marker packets to the access node (gNodeB in 5G) 201, and packet routing and forwarding functions.

Further, the UPF component 216 can include one or more ports that are associated with different reference points. For example, the UPF component 216 can include a first set of ports associated with reference points for data transmission between different network nodes, and a second set of ports associated with reference points for control signal transmission between different network nodes. This can include at least a port associated with the N3 reference point, which is used as a data input or output between the UPF component 216 and access node 201. Further, the UPF component 216 includes at least a port associated with the N6 reference point, which is used as a data input or output between the UPF component 216 and DN 218. Further, the UPF component 216 includes at least a port associated with a control signal reference point, such as the N4 reference point, which is used as an input for control signals via control plane 221. For example, as described herein, a server or host module in the UPF component 216 is configured to receive session information from SMF 214, via the port associated with the N4 reference point. The control information received via the N4 reference point includes information related to provisioning a new session (e.g. using PFCP, quality of service information, billing information, unique identifiers for a session, and so on. Other ports and/or reference points may also be included.

Through the AMF 211, the PCF 213 delivers URSP rules to the wireless devices 228 over the access network 201. The URSP rules apply to the PDU sessions established with the wireless devices 228 through the UPF 216. The URSP rules are utilized by the wireless devices 228 to determine how outgoing traffic should be routed. As set forth herein, the URSP rules can be delivered via the AMF 211 from the PCF 213 to the wireless devices 228. The PCF 213 can provide access and mobility management related policies to the AMF 211 via an N15 interface. In accordance with embodiments set forth herein, based on uplink data packet characteristics, the packet can be routed to an established PDU session or can trigger an establishment of a new PDU session. The AMF 211 can communicate with the access node 201 via the N2 reference point for access and mobility management of wireless access devices in the system 200, for example by delivering the URSP rules over the N2 interface. The UPF 216 can communicate with the access node 201 via the N3 interface. The DN 218 can communicate with the UPF 216 via an N6 interface.

According to aspects of the disclosure, when the wireless devices 228 trigger an application and/or attempt to send an uplink data packet, a route for the uplink data packets application can be determined according to enhanced UE processing 230, which will further be described below in connection with FIG. 3. According to the enhanced processing 230, the uplink packets can be routed to an established PDU session utilizing a USRP rule or can trigger establishment of a new PDU session requiring re-evaluation of URSP rules. The enhanced processing 230 determines whether to route the uplink packets to an existing PDU session or whether to create a new PDU session based on a comparison with stored information in a PDU session cache.

Figure 3:
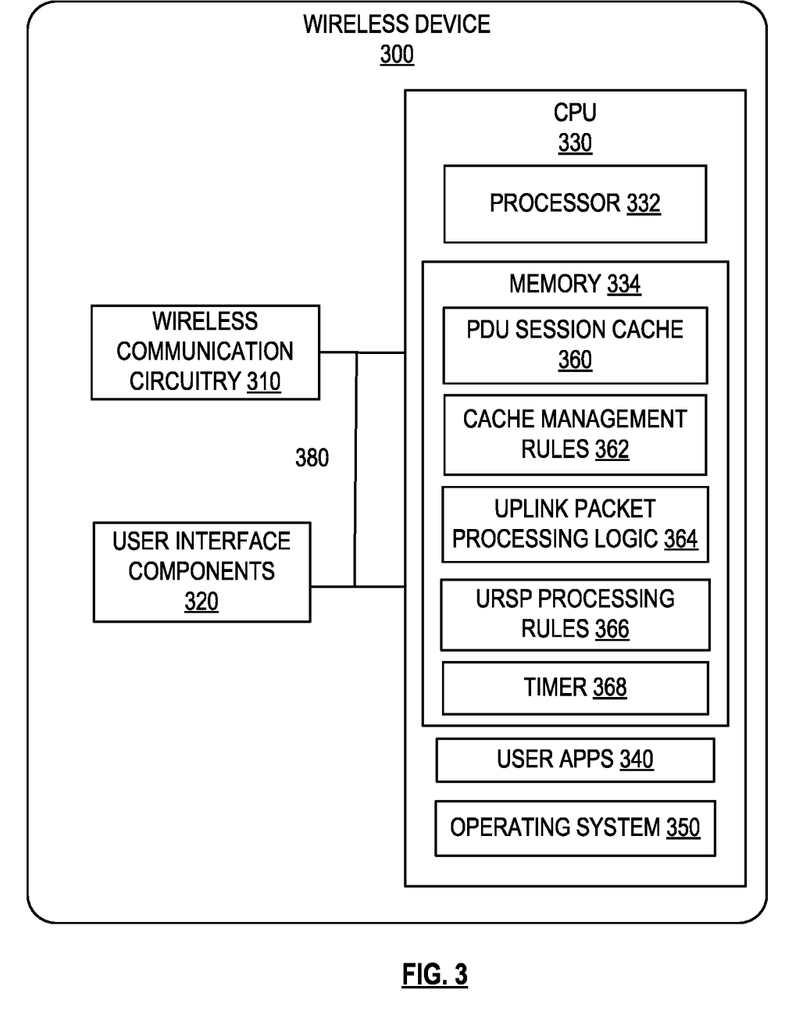
FIG. 3 depicts a wireless device in accordance with disclosed embodiments.

FIG. 3 depicts a wireless device (UE) 300 in accordance with disclosed embodiments. The wireless device may correspond to one of wireless devices 130 in FIG. 1 or wireless device 228 in FIG. 2. As illustrated, the wireless device 300 includes wireless communication circuitry 310, user interface components 320, a central processing unit (CPU) 330, processor 322, memory 334, user apps 340, and operating system 350. Components may be connected, for example, by a bus 380. These components are merely exemplary and the wireless device 300 may include a larger or smaller number of components capable of preforming the functions described herein. Wireless devices such as smartphones may have multiple microprocessors and microcontrollers. A microprocessor may have a bus to communicate with memory on separate chips and buses to communicate with the rest of the equipment. Alternatively or additionally, the mobile phone may include a System On a Chip (SoC).

The memory 334 may store, for example a PDU session cache 360, cache management rules 362, uplink packet processing logic 364, URSP rules 366, and timer 368 and additionally may store other programming. Various combination of these components may function as the enhanced processing 230 described above in connection with FIG. 2. When executed by the processor 332, the programming shown initiates and performs the method described below with reference to FIGS. 4-8.

The PDU session cache 360 may store information including a source and destination IP address and a source and destination port number. The IP address identifies a machine in an IP network and is used to determine the destination of the uplink data packet. Port numbers identify a particular application or service on a system. The port number is a way to identify a specific process to which an internet or other network message is to be forwarded when it arrives at a server. In combination with this information, the PDU session cache 360 may store a PDU session ID corresponding to the specific combinations of IP address and port numbers. Further, the PDU session may store a corresponding URSP rule for each PDU session ID.

The cache management rules 362, which will be further described below, include rules for adding and deleting information from the PDU session cache 360. As will be further described herein, the cache management rules 362 may cause the processor 332 to add a new PDU session with corresponding IP tuple information and URSP rule to the PDU session cache. The cache management rules 362 may further cause the processor 332 to delete entries from the cache when URSP rules expire, when a PDUE session becomes invalid, and in other instances to be further described below.

The URSP rules 366 originate with the PCF 213 and are delivered to the wireless device 300 by the AMF 211. In some embodiments, the URSP rules 366 may have associated timers 368 causing them to expire after a predetermined duration.

The wireless communication circuitry 310 may include circuit elements configured to generate wireless signals (e.g., one or more antennas) as well as interface elements configured, for example, to translate control signals from the CPU 330 into data signals for wireless output. Further, the wireless communication circuitry 310 may include multiple elements, for example to communicate in different modes with different RATs. The CPU 330 may be configured to receive, interpret, and/or respond to signals received via the wireless communication circuitry 310. The CPU 330 may be configured to receive a network command (e.g., from an access node such as the RAN 120) and, in response thereto, to join the network in a particular RAT or to switch from one RAT to another or perform other specified functions. The user interface components 320 may be or include any components enabling a user to interact with the wireless device 300

Figure 4:
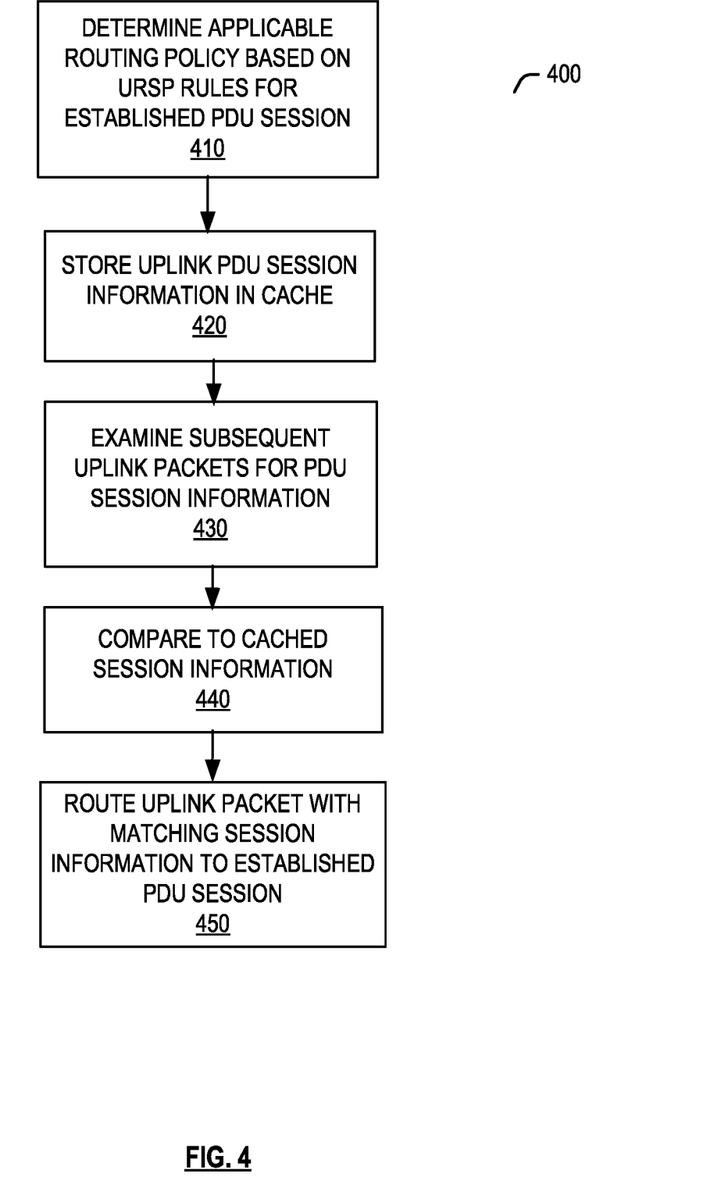
FIG. 4 is a flow chart depicting an exemplary method for rapid user equipment route selection policy rule processing.

The disclosed methods for performing rapid re-evaluation of URSP rule processing are further described with references to FIGS. 4-8 below. FIG. 4 illustrates an exemplary method 400 for rapid URSP rule processing in accordance with disclosed embodiments. Method 400 may be performed by any suitable processor discussed herein, for example, a processor included in the wireless devices 130, 228, and 300. For convenience and purposes of illustration, the steps are described as being performed by the wireless device 300. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

In step 410, the uplink packet processing logic of the wireless device 300 may determine applicable routing policy for an established PDU session based on stored or received URSP rules. As described above, the URSP rules may be generated by the PCF and transmitted to the wireless device 300 by the AMF through the access node.

In step 420, the wireless device 300 stores the uplink PDU session information in the PDU session cache 360. The PDU session information may include, for example IP tuple information including source and destination IP addresses and ports. The PDU session information may further include, for example, a PDU session ID and applicable routing policy.

In step 430, the wireless device 300 examines subsequent uplink packets for PDU session information. For example, the uplink packet processing logic 364 examines the uplink packets for the IP tuple information, which may include, for example source and destination IP addresses and ports.

In step 440, the uplink packet processing logic 364 compares the information in the uplink packet to the PDU session information stored in the PDU session cache 360. For example, the uplink packet processing logic 364 compares the source and destination IP addresses and ports in the uplink packet to the stored source and destination IP addresses and ports in the PDU session cache 360. The comparison is made to determine if the uplink packet information matches the information for a stored PDU session. Note that if a wireless device only uses a single IP address for all its uplink traffic, then the PDU session cache 360 does not need to contain nor match the IP source address, rather only the source port.

In step 450, the uplink packet processing logic 364 routes uplink packets with matching session information to the established PDU session retrieved from the PDU session cache 460. Thus, because the uplink packet has information matching an established PDU session, the uplink packet is routed to that established PDU session, for which URSP rules have already been processed, thereby avoiding re-processing of the URSP rules.

Figure 5:
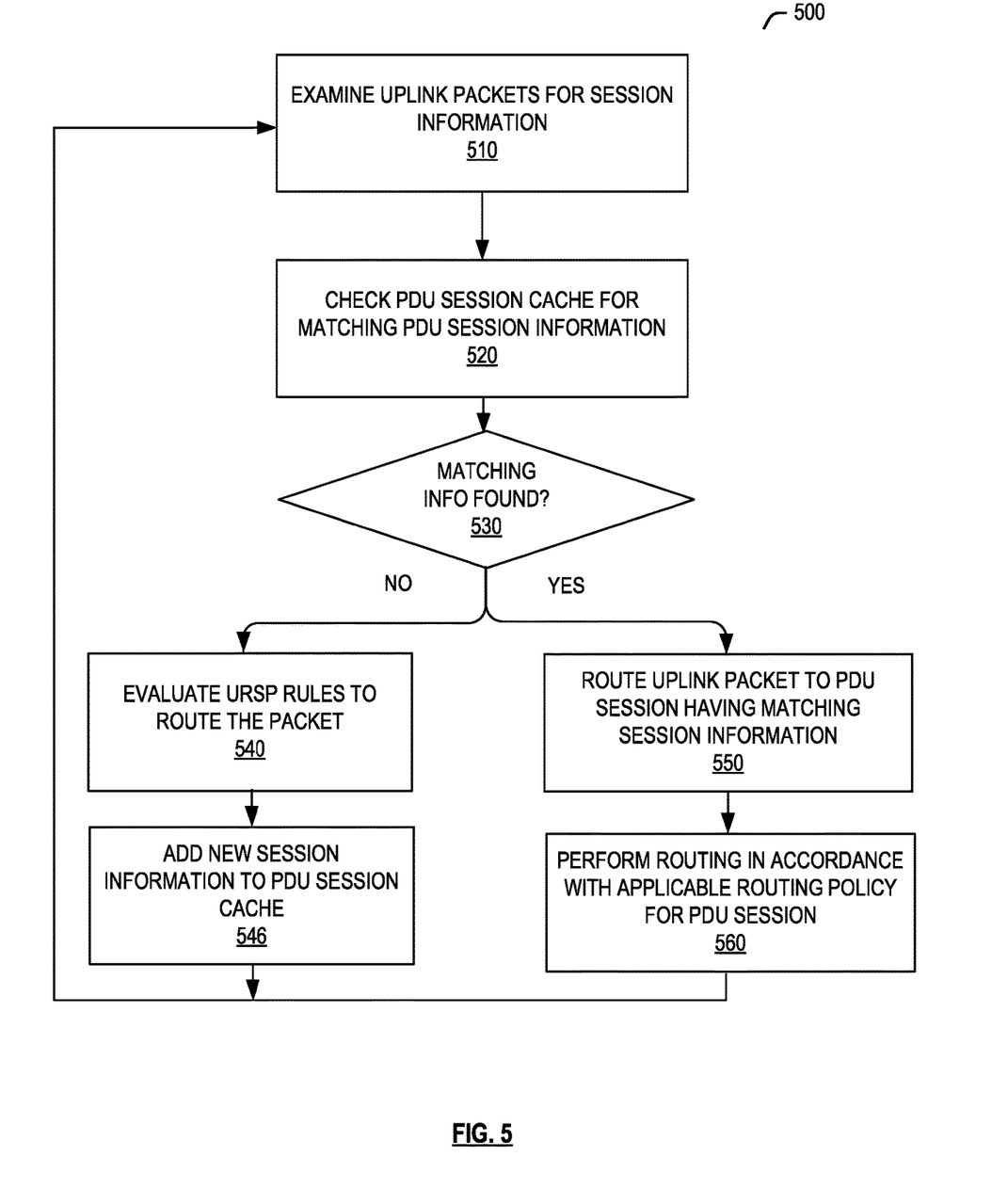
FIG. 5 depicts a further exemplary method for rapid user equipment route selection policy rule processing.

FIG. 5 illustrates an exemplary method 500 for rapid URSP rule processing in accordance with disclosed embodiments. Method 500 may be performed by any suitable processor discussed herein, for example, a processor included in the wireless devices 130, 228, and 300. For convenience and purposes of illustration, the steps are described as being performed by the wireless device 300. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Method 500 starts in step 510 when the uplink packet processing logic 364 examines uplink packets for session information. For example, the uplink packet processing logic 364 examines the uplink packets for IP tuple information, which may include, for example, source and destination IP addresses and source and destination ports.

In step 520, the uplink packet processing logic 364 checks the PDU session cache 360 for matching PDU session information. For example, the uplink packet processing logic 364 checks the PDU session cache 360 for matching source and destination IP addresses and ports already associated with a processed URSP rule.

If the matching information is found at step 530, the uplink packet processing logic 364 may route the uplink packet to a PDU session having the matching session information in step 550. In this situation, routing is performed in accordance with applicable routing policy for the PDU session in step 560.

However, if the matching information is not found in step 560, the cache management rules 362 require that new session information be added to the PDU session cache. In this instance, the URSP rules 366 must be re-evaluated for the purposes of packet routing in step 540. Thus, when a packet comes in, the uplink packet processing logic evaluates it to determine if IP tuples on both send and receive match any cached information. If it does not, then the uplink packet processing logic 364 evaluates the packet per the USRP rules and determines what slice to send it out on. Once that has been determined, the cache management rules 362 may require that the IP tuple and the slice are added to the cache in step 546 along with a newly created PDU session ID. If another packet subsequently comes in with the same tuple, the corresponding PDU session information is discovered in the cache and is used for routing. If a packet has a different tuple from the same application, for example, two different websites from the same browser, then URSP re-evaluation is required.

Thus, when matching information is found in step 530, considerable resource conservation occurs as no repeated evaluation of URSP rules is required. When the matching information is not found, i.e., a new IP tuple not present in the cache is encountered, then the new session information is added to the PDU session cache 360 such that resource conservation can occur for future uplink packets. For example, an application accessing a new website or an application is started on the wireless device accessing the Internet. Once the PDU session is established, a new cache entry is created with the IP tuple and PDU session ID.

Figure 6:
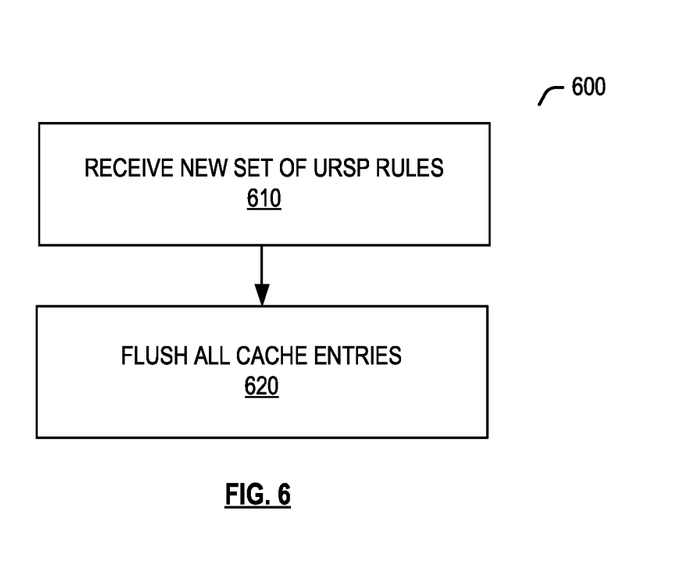
FIG. 6 depicts an exemplary method for PDU session cache management in accordance with disclosed embodiments.
Figure 7:
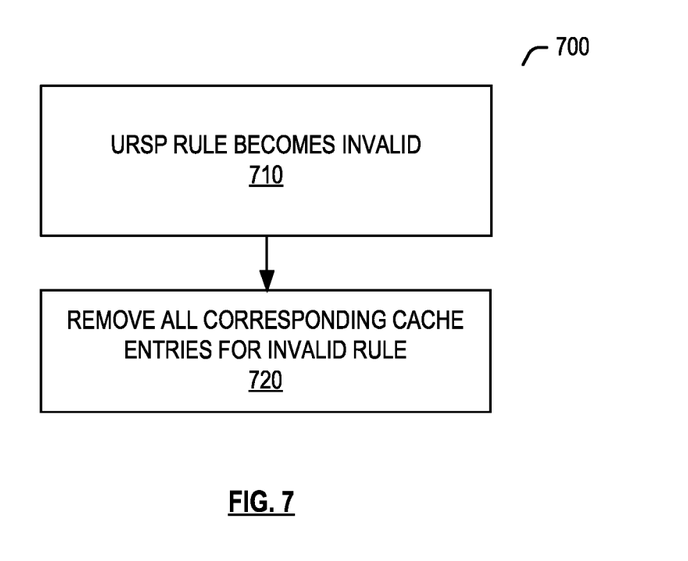
FIG. 7 depicts another exemplary method for PDU session cache management in accordance with disclosed embodiments.
Figure 8:
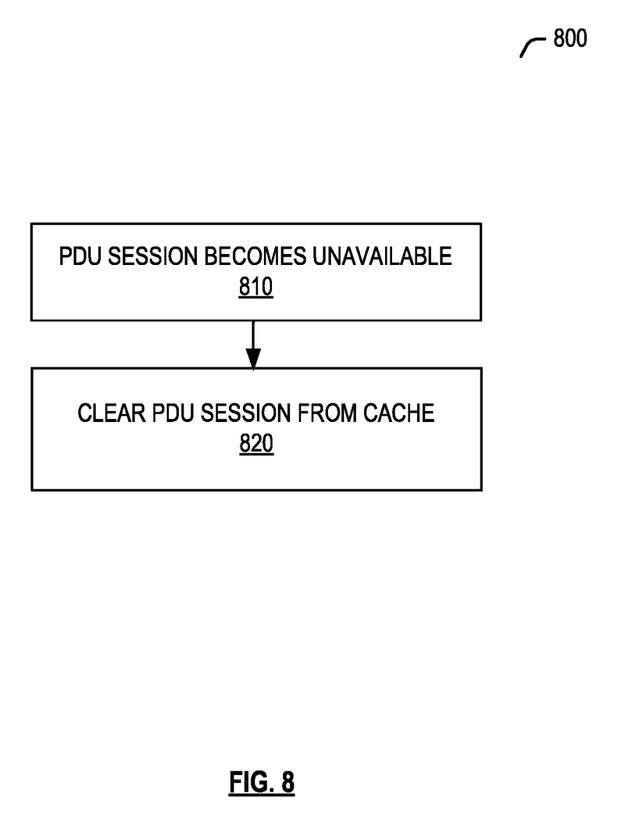
FIG. 8 illustrates a further exemplary method for PDU session cache management in accordance with disclosed embodiments.

FIGS. 6-8 illustrate cache management methods in accordance with embodiments set forth herein. Various events may cause the PDU session cache 360 to be re-evaluated. The wireless device 300 performs the re-evaluation and executes cache management rules 362 to add or delete entries from the PDU session cache 360. As set forth above, IP tuples are added to the cache when they are discovered in uplink packets and a corresponding PDU session ID may also be added when the PDU session is established. The methods below are related to deletion of items from the PDU session cache in various instances.

FIG. 6 illustrates an exemplary method 600 for cache management to enable rapid user equipment route selection rule processing in accordance with disclosed embodiments. Method 600 may be performed by any suitable processor discussed herein, for example, a processor included in the wireless devices 130, 228, and 300. For convenience and purposes of illustration, the steps are described as being performed by the wireless device 300. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

In step 610 of FIG. 6, the wireless device 300 receives a new set of URSP rules originating at the PCF 213. The PCF 213 forwards the rules to the AMF 211, which transmits the rules to the wireless device 300 through the access node 201. Upon receipt of the URSP rules, the wireless device 300 may store the URSP rules in memory 334, replacing the previously stored URSP rules.

In step 620 of FIG. 6, the cache management rules 362 require that the entire PDU session cache 360 be flushed in view of the new URSP rules. The previously stored session information is no longer valid. Accordingly, the wireless device 300 processes the cache management rules 362 to flush the PDU session cache 360.

FIG. 7 illustrates an exemplary method 700 for cache management to enable rapid user equipment route selection rule processing in accordance with disclosed embodiments. Method 700 may be performed by any suitable processor discussed herein, for example, a processor included in the wireless devices 130, 228, and 300. For convenience and purposes of illustration, the steps are described as being performed by the wireless device 300. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

In step 710, the wireless device 300 learns that one or more stored URSP rules have become invalid. The wireless device 300 may learn the rule is invalid based on a communication from the PCF and AMF of the core network. Alternatively, the wireless device 300 may store a timer 368 associated with one or more URSP rules. When the timer 368 expires, the wireless device 300 determines that the URSP rule has expired. In embodiments set forth herein, each URSP rule may have an associated timer.

In step 720, the wireless device 300 determines that cache management rules 362 require that corresponding expired or invalid entries in the PDU session cache 360 be removed from the PDU session cache. As explained above the PDU session cache 360 may store PDU session information with an associated URSP rule. Thus, the entries associated with the URSP rule that is no longer valid may be removed from the PDU session cache 360. URSP rules may become invalid, for example, due to a timer expiry or a change in location, as specified in the URSP rule. In this case, all corresponding cache entries identified by PDU session ID for that invalid or expired rule are removed based on processing of the cache management rules 362.

FIG. 8 illustrates an exemplary method 800 for cache management to enable rapid user equipment route selection rule processing in accordance with disclosed embodiments. Method 800 may be performed by any suitable processor discussed herein, for example, a processor included in the wireless devices 130, 228, and 300. For convenience and purposes of illustration, the steps are described as being performed by the wireless device 300. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

In step 810, the wireless device 300 may learn that a PDU session has become unavailable. This may occur, for example when a change in radio connectivity changes the available PDU sessions (such as handing over from 3GPP access to non-3GPP access and switching back to 3GPP access). This may alternatively occur when a PDU session is torn down. For example, the network may initiate a PDU session termination. Situations also occur in which an application or socket is terminated. The socket is defined by the source and destination IP address and the source and destination port numbers. The socket is used to identify the server and the service being requested by a client.

In step 820, the wireless device 300 clears all entries for the unavailable PDU session from the PDU session cache 360 in accordance with the cache management rules 362. Accordingly, future uplink packets will not be routed to the unavailable PDU session. Further, in the case of application or socket termination, all corresponding cache entries utilizing the same source port number are removed from the PDU session cache 360.

In some embodiments, methods 400, 500, 600, 700, 800, and 900 may include additional steps or operations. Furthermore, the methods may include steps shown in each of the other methods. As one of ordinary skill in the art would understand, the methods 400, 500, 600, 700, 800, and 900 may be integrated in any useful manner.

By the methods described herein, rapid user equipment route selection police rule processing can be facilitated, thereby conserving wireless device resources and reducing latency. The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   determining an applicable routing policy based on user equipment route selection policy (URSP) rules for an established uplink protocol data unit (PDU) session, the PDU session established with a wireless device through a user plane function (UPF) of a core network, the UPF connecting with the wireless device over an access network;
   storing, at the wireless device, uplink PDU session information with the established uplink PDU session in a cache;
   examining subsequent uplink packets at the wireless device for uplink PDU session information;
   checking the cache at the wireless device for an established PDU session with matching uplink PDU session information; and
   routing, at the wireless device, the subsequent uplink packets to the established PDU session having the matching PDU session information, causing the subsequent uplink packet to be processed in accordance with the applicable routing policy as previously determined based on the URSP rules.

2. The method of claim 1, wherein the uplink PDU session information includes at least a destination IP address and port numbers and a source IP port number.

3. The method of claim 1, wherein the uplink PDU session information comprises a source IP address and port number when multiple source IP addresses are utilized for uplink traffic.

4. The method of claim 1, further comprising adding a new PDU session to the cache upon failure to locate the matching uplink PDU session information.

5. The method of claim 1, further comprising flushing the cache upon receipt of updated URSP rules.

6. The method of claim 1, further comprising flushing at least one cache entry upon a determination that at least one URSP rule is invalid.

7. The method of claim 1, further comprising flushing entries from the cache upon detecting a change in radio connectivity altering available PDU sessions.

8. The method of claim 1, further comprising storing the uplink PDU session in a wireless device cache.

9. A wireless device comprising:
   at least one memory of the wireless device storing a protocol data unit (PDU) session cache including PDU session information for at least one established PDU session, the PDU session established with the wireless device through a user plane function (UPF) of a core network, the UPF connecting with the wireless device over an access network; and
   at least one processor of the wireless device managing the PDU session cache at the wireless device by performing multiple operations including;
   examining uplink packets for PDU session information;
   checking the PDU session cache for an established PDU session with matching PDU session information;
   adding a new PDU session to the PDU session cache when no matching PDU session information is located in the PDU session cache; and
   when the matching PDU session information is located, routing the uplink packet to the established PDU session having the matching PDU session information, causing the uplink packet to be processed in accordance with an applicable routing policy previously determined based on user equipment route selection policy (URSP) rules.

10. The wireless device of claim 9, wherein the PDU session information comprises at least a destination address and port numbers and source IP port numbers.

11. The wireless device of claim 9, wherein the PDU session information comprises a source IP address and port number when the wireless device utilizes multiple source IP addresses for uplink traffic.

12. The wireless device of claim 9, wherein the operations include flushing the PDU session cache upon receipt of updated URSP rules.

13. The wireless device of claim 9, the operations further comprising flushing at least one cache entry upon a determination that at least one URSP rule is invalid.

14. The wireless device of claim 9, the operations further comprising flushing entries from the PDU session cache upon detecting a change in radio connectivity altering available PDU sessions.

15. A non-transitory computer readable medium storing instructions executed by a processor to perform operations comprising:
   examining uplink packets for PDU session information;
   checking a PDU session cache at a wireless device for an established PDU session with matching PDU session information, the established PDU session established with the wireless device through a user plane function (UPF) or a core network, the UPF connecting with the wireless device over an access network;
   adding a new PDU session to the PDU session cache at the wireless device when no matching PDU session information is located in the PDU session cache; and
   when the matching PDU session information is located, routing the uplink packet from the wireless device to the established PDU session having the matching PDU session information, causing the uplink packet from the wireless device to be processed in accordance with an applicable routing policy previously determined based on user equipment route selection policy (URSP) rules.

16. The non-transitory computer readable medium of claim 15, wherein the PDU session information includes at least a destination IP address and port numbers and source IP port numbers.

17. Then non-transitory computer readable medium of claim 15, wherein the PDU session information comprises a source IP address and port numbers when multiple source IP addresses are utilized for uplink traffic.

18. The non-transitory computer readable medium of claim 15, the operations further comprising adding a new PDU session to the PDU session cache upon failure to locate the matching PDU session information.

19. The non-transitory computer readable medium of claim 15, the operations further comprising flushing the PDU session cache upon receipt of updated URSP rules.

20. The non-transitory computer readable medium of claim 15, the operations further comprising flushing at least one cache entry upon a determination that at least one URSP rule is invalid.

* * * * *